United States Patent [19]
DeBartolo, Jr. et al.

[11] Patent Number: 6,084,180
[45] Date of Patent: Jul. 4, 2000

[54] MULTI-CHANNEL DUCT FOR POWER AND TEL/COM CONDUCTORS

[76] Inventors: Joseph V. DeBartolo, Jr., 19 Hangman Hill Rd., North Stonington, Conn. 06359; John P. Goodsell, 462 Housatonic Ave., Stratford, Conn. 06497; Frederic F. Small, 104 Irving St., Mystic, Conn. 06355; Karl Yetter, 164 Stoddards Wharf Rd., Gales Ferry, Conn. 06335

[21] Appl. No.: 08/151,741

[22] Filed: Nov. 15, 1993

[51] Int. Cl.$^7$ ................................................. H02G 3/04
[52] U.S. Cl. ............................ 174/95; 174/48; 174/101
[58] Field of Search ........................... 174/48, 49, 95, 174/97, 99 R, 101; 52/287.1, 288.1, 714

[56] References Cited

U.S. PATENT DOCUMENTS

| | | | |
|---|---|---|---|
| 3,471,629 | 10/1969 | O'Leary | 174/49 |
| 3,786,171 | 1/1974 | Shira | 174/101 X |
| 4,286,630 | 9/1981 | Happer | 138/92 |
| 4,530,865 | 7/1985 | Sprenger | 174/95 X |
| 4,602,124 | 7/1986 | Santucci | 174/101 |
| 4,720,768 | 1/1988 | Schindele | 174/101 X |
| 4,942,271 | 7/1990 | Corsi et al. | 174/101 |
| 4,990,722 | 2/1991 | Benito Navazo | 174/97 |
| 5,134,250 | 7/1992 | Caveney et al. | 174/101 |
| 5,336,849 | 8/1994 | Whitney | 174/48 |

FOREIGN PATENT DOCUMENTS

| | | | |
|---|---|---|---|
| 2124163 | 11/1972 | Germany | 174/101 |
| 0443432 | 2/1968 | Switzerland | 174/101 |
| 609177 | 2/1979 | Switzerland . | |
| 0881847 | 11/1961 | United Kingdom | 174/101 |
| 1009092 | 11/1965 | United Kingdom . | |

*Primary Examiner*—Hyung S. Sough
*Attorney, Agent, or Firm*—Jerry M. Presson; Davis L. Tarnoff; Thomas P. Hilliard

[57] ABSTRACT

A multi-channel duct for enclosing conductors, cables, wires, power lines, communications lines and the like. The multi-channel duct includes an elongated base with an elongated divider dividing the base into two channels, and a pair of elongated covers with the outer cover overlying both channels and the inner cover overlying one of the channels. Preferably, the inner cover is integrally formed with the divider and has a precurved portion for preloading the inner cover when in its closed position. The divider and inner cover are preferably detachable from the base by a frangible seam for converting the two channel duct to a single channel duct.

22 Claims, 5 Drawing Sheets

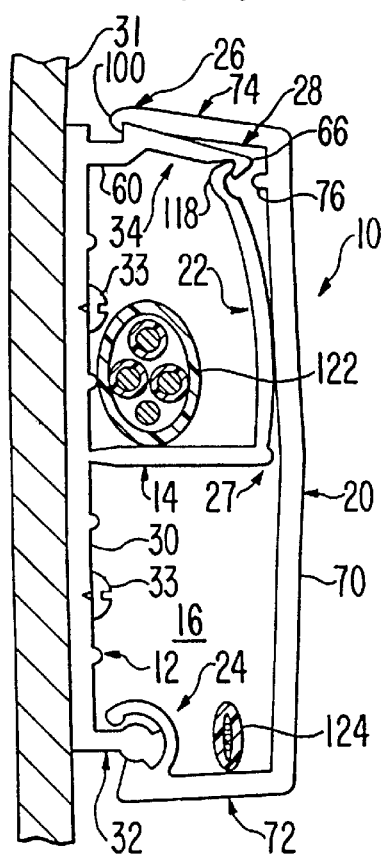
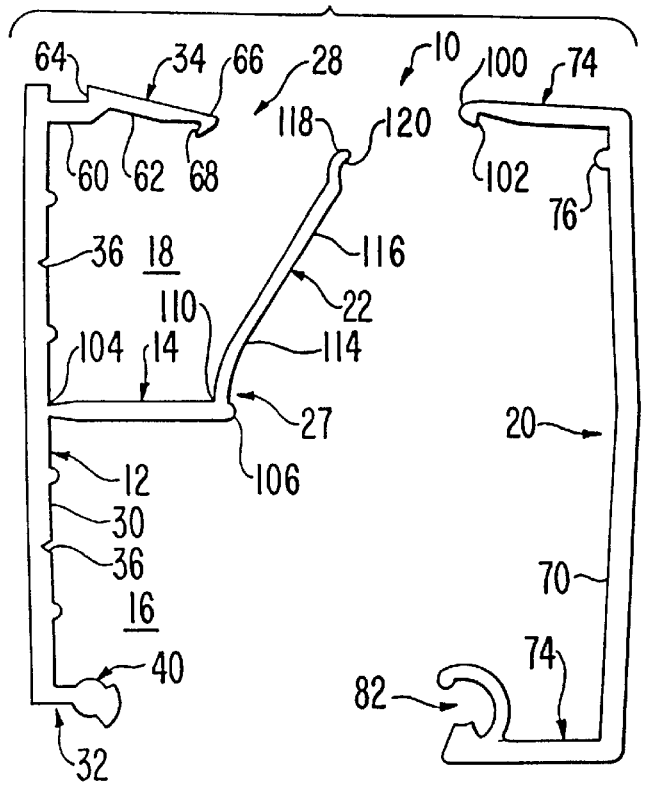
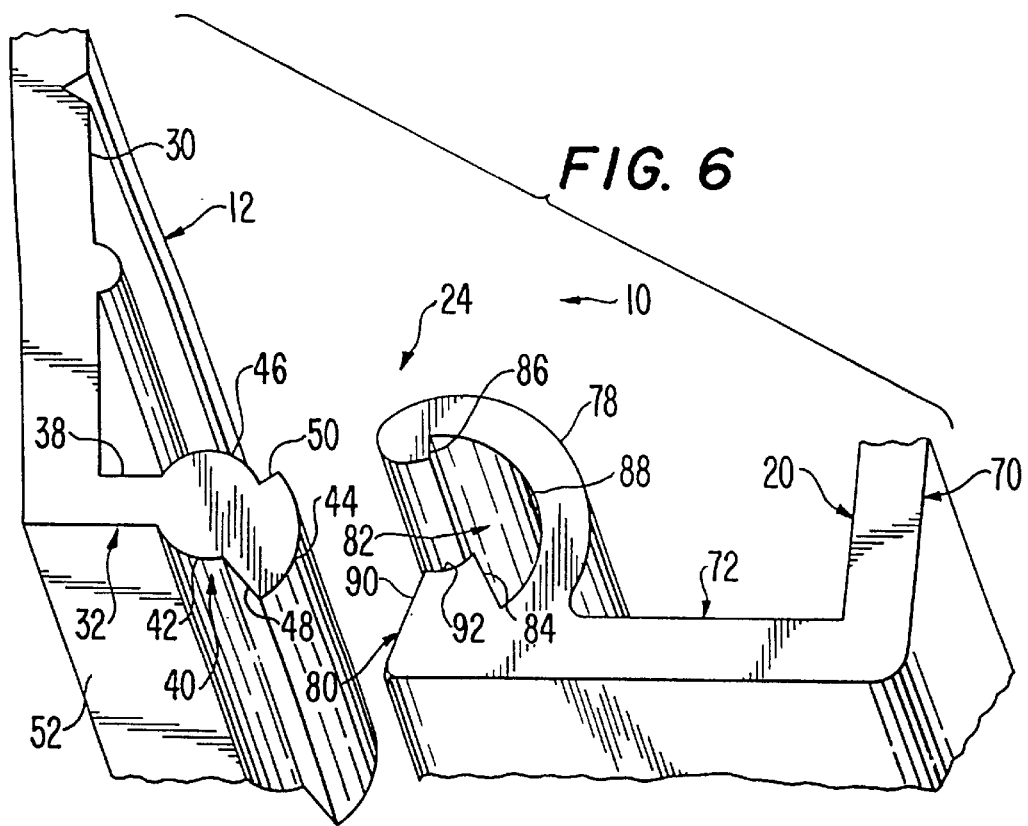

MULTI-CHANNEL DUCT FOR POWER AND TEL/COM CONDUCTORS

FIELD OF THE INVENTION

This invention relates to a multi-channel duct for enclosing conductors, cables, wires, power lines, communications lines and the like. More specifically, the invention relates to a multi-channel duct having an elongated base adapted to be mounted on a surface, a divider for dividing the duct into two longitudinally extending channels, an outer cover coupled to the base for overlying both channels, and an inner cover coupled to the base by the divider for overlying one of the channels.

BACKGROUND OF THE INVENTION

Numerous wiring ducts are known in the prior art for mounting conductors, cables, electrical wires, communications lines and the like therein. However, there are several disadvantages to many of the prior art wiring ducts. For example, most of the prior art ducts that have a removable cover which requires the conductors to be placed in the base of the wiring duct before the cover is attached. This makes installation difficult, since the conductors or wires have a tendency to fall out of the base before the cover is attached. In addition, some of the prior art wiring ducts have hinged covers which require numerous parts, and thus are costly to manufacture. Moreover, the hinged covers of the prior art wiring ducts are difficult to attach to the base and typically have unrestricted pivotal movement through 180°.

Examples of some prior art wiring ducts are disclosed in the following U.S. patents: U.S. Pat No. 3,471,629 to O'Leary; U.S. Pat No. 3,786,171 to Shira; U.S. Pat. No. 4,286,630 to Happer; U.S. Pat. No. 4,602,124 to Santucci; U.S. Pat. No. 4,720,768 to Schindele; U.S. Pat. No. 4,942,271 to Corsi et al.; U.S. Pat. No. 4,990,722 to Benito Navazo; and U.S. Pat. No. 5,134,250 to Caveney et al. Another example of a wiring duct is disclosed in U.K. Patent 1,009,092 to Theysohn, which discloses a multi-channel wiring duct.

In view of the above, it is apparent that there exists a need for a multi-duct which can readily receive two different sets of wires which are maintained separately from each other to provide quick and easy installation thereof. This invention addresses this need in the art, along with other need which will become apparent to those skilled in the art once given this disclosure.

SUMMARY OF THE INVENTION

Accordingly, an object of the invention is to provide a multi-channel duct that can readily receive two different sets of wires which are maintained separately from each other therein.

Another object of the invention is to provide a multi-channel duct having at least two channels with a first cover overlying one of the two channels and a second cover overlying both of the channels for accommodating two different sets of wires.

Another object of the invention is to provide a multi-channel duct which can be converted to a single channel duct.

Another object of the invention is to provide a multi-channel duct which can be easily manufactured at a relatively low cost.

The foregoing objects are basically attained by providing a multi-channel duct for enclosing conductors therein, comprising: an elongated base having a substantially planar central portion for mounting on a surface, and a pair of longitudinal edges; an elongated divider coupled to the central portion of the base and extending substantially perpendicular to the central portion of the base between the longitudinal edges of the base for dividing the base into two longitudinally extending sections; a first elongated cover for overlying and substantially covering both of the longitudinally extending sections of the base; a first coupling joint coupled to the base and the first cover for coupling the first cover to the base between a first position covering both of the longitudinally extending sections and a second position exposing at least one of the longitudinally extending sections; a second elongated cover with first and second longitudinal edges for overlying and substantially covering one of the longitudinally extending sections of said base; and a second coupling joint coupled to the base and the second cover, for coupling the second cover to the base between a first position covering one of the longitudinally extending sections and a second position exposing the one of the longitudinally extending sections concealable by the second cover.

The foregoing objects are also basically attained by providing a multi-channel duct for enclosing conductors therein, comprising: an elongated base having a substantially planar central portion with first and second longitudinal edges; an elongated divider having a first longitudinal edge coupled to the central portion of the base, and a second longitudinal edge spaced from the central portion of the base with the partition extending substantially perpendicular to the central portion of the base between the first and second longitudinal edges of the base for dividing the base into two longitudinally extending sections; a first elongated cover for overlying both of the longitudinally extending sections, and having an intermediate portion with first and second longitudinal edges; a first pivot joint coupled to the base and the first cover for coupling the first longitudinal edge of the base to the first longitudinal edge of the first cover; a first latch coupled to the base and the first cover for releasably coupling the second longitudinal edge of the base to the second longitudinal edge of the first cover; a second elongated cover for overlying one of the longitudinally extending sections, and having first and second longitudinal edges; a second pivot joint coupled to the first longitudinal edge of the second cover and the second longitudinal edge of the divider for coupling the second cover to the divider; and a second latch coupled to the base and the second cover for releasably coupling the second longitudinal edge of the second cover to one of the longitudinal edges of the base between a first position covering one of the longitudinally extending sections and a second position exposing the one of the longitudinally extending sections concealable by the second cover.

Other objects, advantages and salient features of the invention will become apparent from the following detailed description, which, taken in conjunction with the annexed drawings, discloses a preferred embodiment of the invention.

BRIEF DESCRIPTION OF THE DRAWINGS

Referring now to the drawings which form part of this original disclosure:

FIG. 4 is a left end elevational view of the multi-channel duct illustrated in FIGS. 1–3 with both the inner and outer covers in their closed or coupled positions, and mounted to a mounting surface;

FIG. 5 is an exploded, left end elevational view of the multi-channel duct illustrated in FIGS. 1–4 in accordance with the present invention;

FIG. 6 is an enlarged, partial, exploded perspective view of the multi-channel duct illustrated in FIGS. 1–5 in accordance with the present invention;

DETAILED DESCRIPTION OF THE INVENTION

Figure 1:
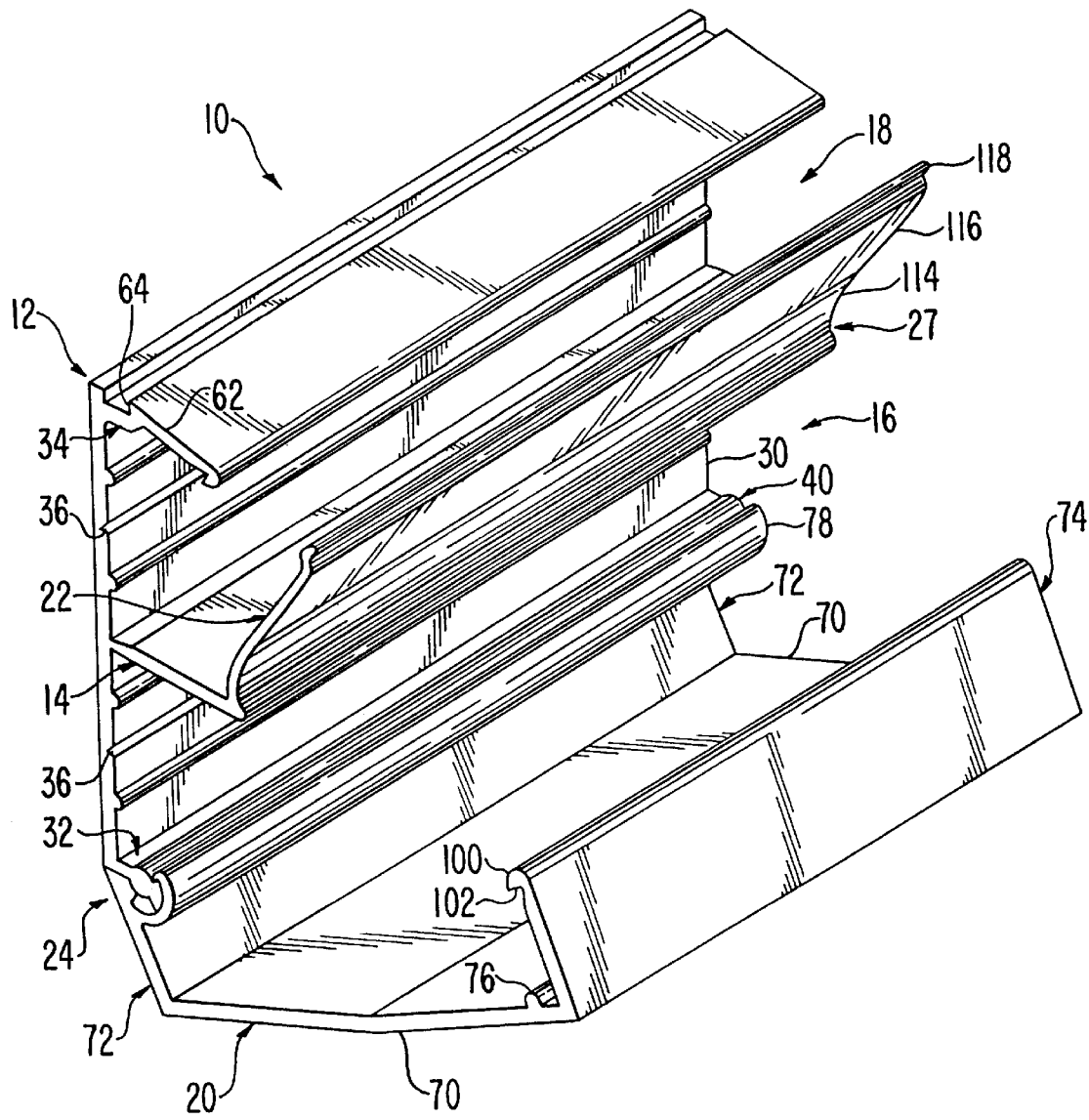
FIG. 1 is a partial, left end perspective view of a multi-channel duct in accordance with the present invention with both the inner and outer covers in their open positions.
Figure 2:
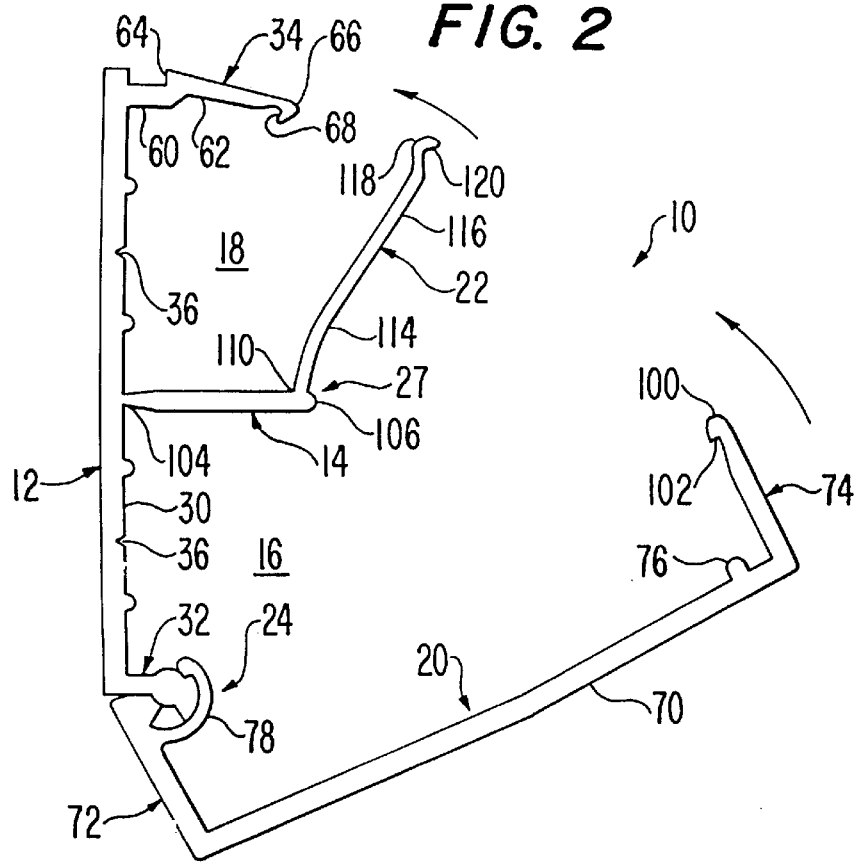
FIG. 2 is a left end elevational view of the multi-channel duct illustrated in FIG. 1 in accordance with the present invention.
Figure 3:
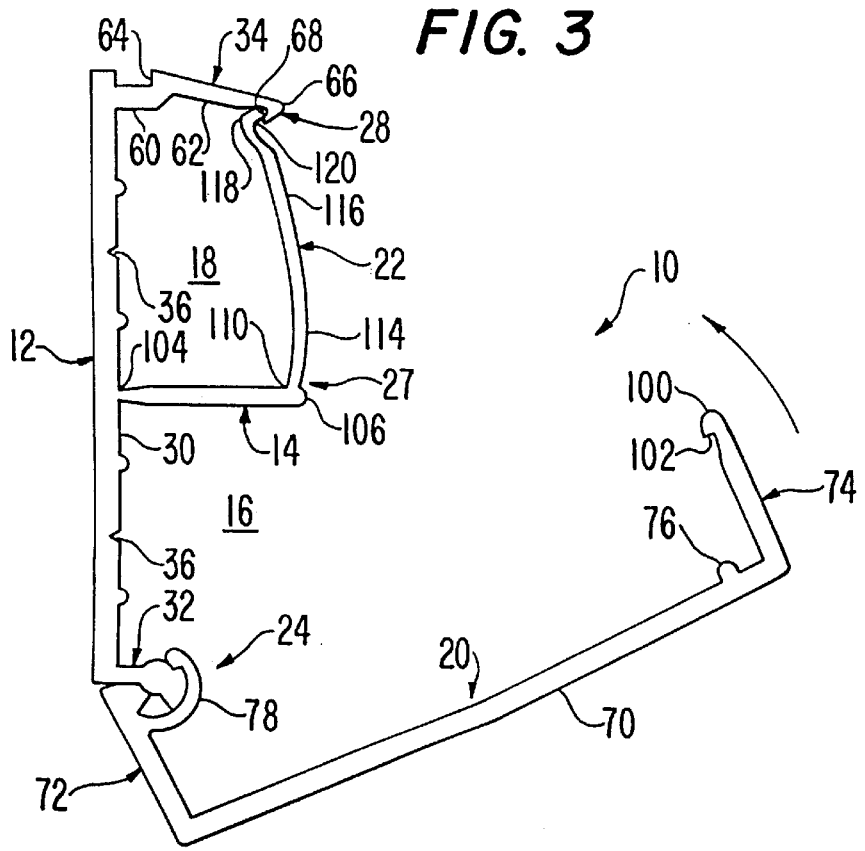
FIG. 3 is a left end elevational view of the multi-channel duct illustrated in FIGS. 1 and 2 with the inner cover in its closed or coupled position and the outer cover in its open or uncoupled position.

Referring initially to FIG. 1, a multi-channel duct or raceway 10 in accordance with the present invention is illustrated, and includes an elongated base 12 adapted to be mounted on a mounting surface, an elongated divider 14 coupled to base 12 for dividing base 12 into two longitudinally extending channels 16 and 18, a first or outer elongated cover 20 for overlying and substantially covering both longitudinally extending channels 16 and 18, and a second or inner elongated cover 22 for overlying and substantially covering longitudinally extending channel 18. Accordingly, inner cover 22 completely covers and closes the opening of channel 18, while outer cover 20 completely covers and closes the opening of channel 16 as well as completely covers and closes channel 18.

Preferably, first cover 20 is pivotally coupled to base 12 by a first pivot joint or hinge 24 at one of its longitudinal edges as seen in FIG. 4, and releasably coupled to base 12 by a first latch 26 at its other longitudinal edge as seen in FIG. 4. Second cover 22 is pivotally coupled to base 12 via divider 14 by a second pivot joint or hinge 27 at one of its longitudinal edges as seen in FIG. 5, and releasably coupled to base 12 by a second latch 28 at its other longitudinal edge as seen in FIG. 5.

Referring now to FIGS. 2–8, base 12 with divider 14 and second cover 22 are preferably formed as a one-piece, unitary, integral member by extrusion of a somewhat resilient polymeric material, such as vinyl or PVC. Base 12 has a generally U-shaped cross-section along its longitudinal axis. Base 12 includes an elongated central portion 30, a first elongated leg 32 integrally formed at one of the longitudinal edges of central portion 30, and a second elongated leg 34 integrally formed at its other longitudinal edge.

As seen in FIG. 4, central portion 30 is capable of being secured to a mounting wall or surface 31 by using conventional fasteners 33 such as nails or screws. A pair of locating recesses 36 are provided in central portion 30 to aid in drilling a hole through base 12 for receiving the fasteners or screws 33 therethrough. In particular, a hole can be drilled through the locating recesses 36 and then fastener 33 is inserted therethrough and threaded into wall or surface 31 for securing duct 10 to wall or surface 31. Central portion 30 is a substantially planar member with first elongated leg 32 extending along the entire length of one of its longitudinal edges and second elongated leg 34 extending along the entire length of its other longitudinal edge. The first and second elongated legs 32 and 34 are preferably integrally formed with central portion 30 and extend substantially perpendicular thereto.

As seen in FIG. 6, first elongated leg 32 includes a planar shank portion 38 extending upwardly from one longitudinal edge of central portion 30, and an elongated rib 40 extending outwardly from planar shank portion 38. Rib 40 forms part of first pivot joint 24, and includes a first curvilinear surface 42, a second curvilinear surface 44, and a third curvilinear surface 46. Rib 40 further includes a first planar stop surface 48 and a second planar stop surface 50. First stop surface 48 extends radially outwardly from the center of rib 40 and interconnects first curvilinear surface 42 with second curvilinear surface 44. Second planar stop surface 50 extends radially outwardly from the center of rib 40 and interconnects second curvilinear surface 44 with third curvilinear surface 46. The planar shank portion 38 of first leg 32 also includes an outwardly facing planar stop surface 52. Preferably, the angle defined between stop surfaces 48 and 50 is about 105°. The pivot joint 24 between base 12 and first cover 20 is discussed and illustrated in more detail in U.S. Pat. No. 4,942,271 to Corsi et al., which is hereby incorporated herein by reference. Thus, the details of the pivot joint 24 will not be discussed in further detail herein.

Figure 7:
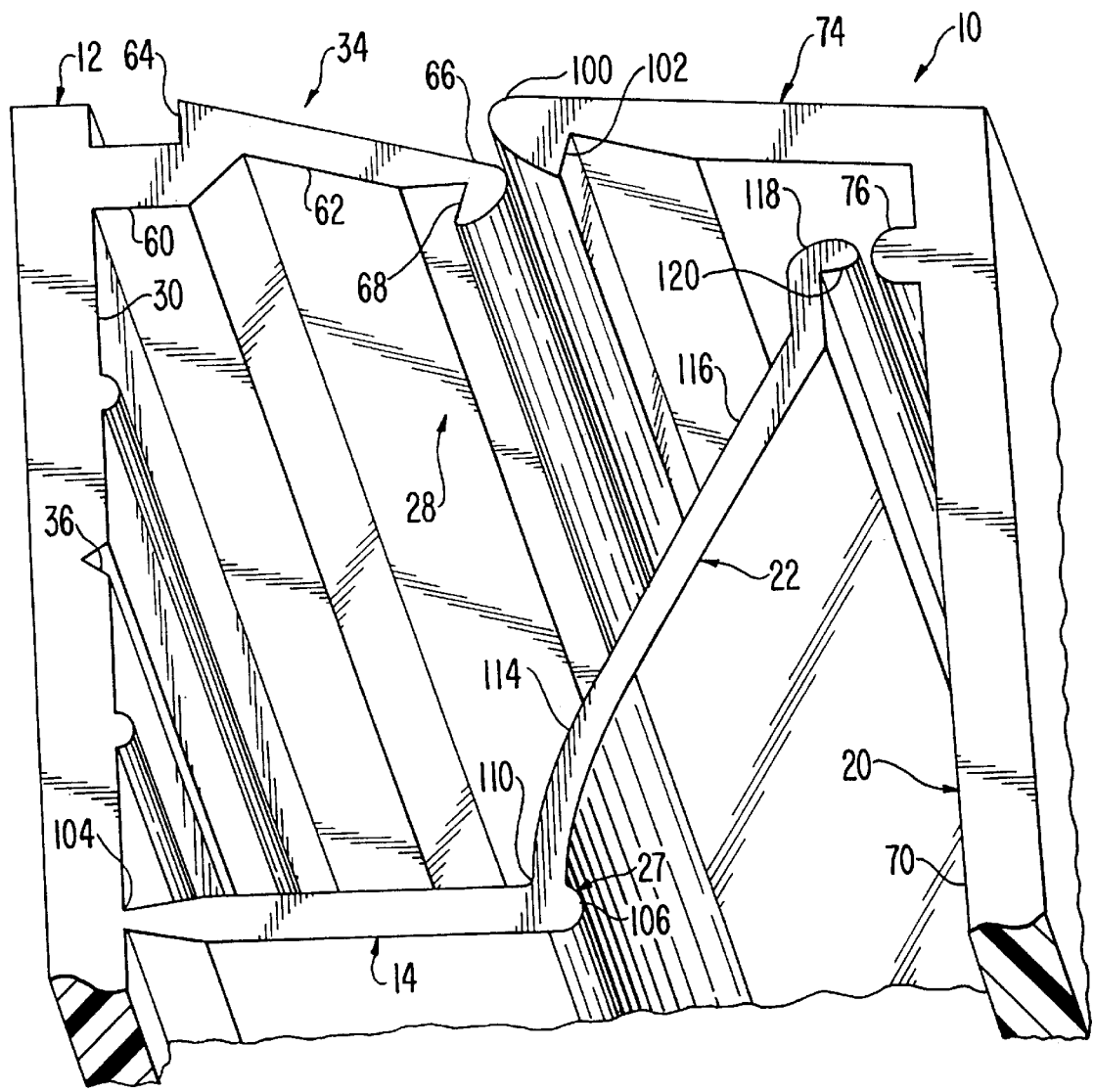
FIG. 7 is an enlarged, partial, exploded perspective view of the multi-channel duct illustrated in FIGS. 1–6 in accordance with the present invention.
Figure 8:
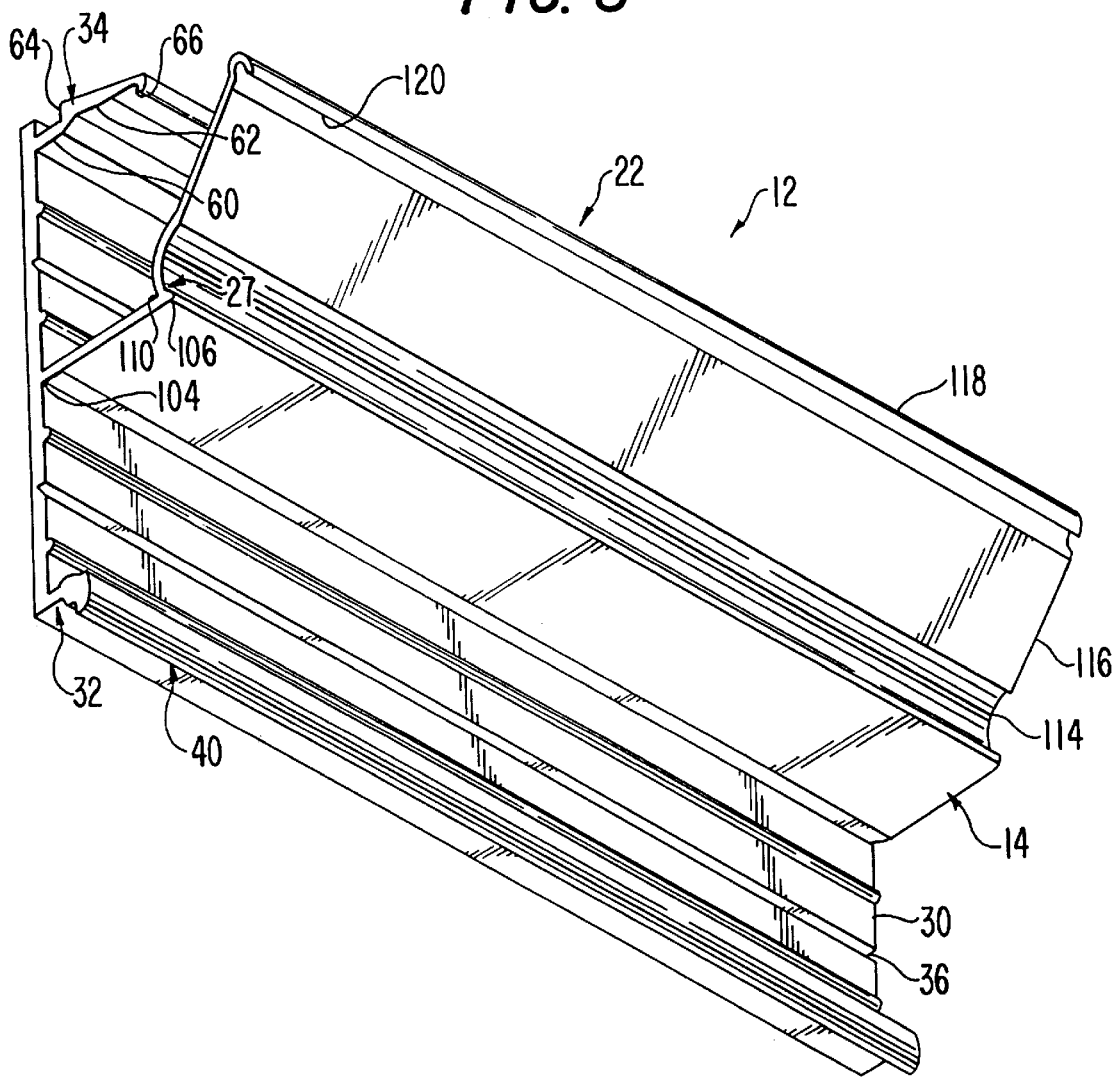
FIG. 8 is a left end perspective view of the base of the multi-channel duct illustrated in FIGS. 1–7 in accordance with the present invention.

As seen in FIG. 7, second elongated leg 34 includes a first wall portion 60 extending outwardly and perpendicularly from one of the elongated edges of central portion 30, and a second wall portion 62 coupled to first wall portion 60 so as to extend upwardly from first wall portion 60 and inwardly toward divider 14. Second wall portion 62 is offset from first wall portion 60 to form an outer latching surface 64 between first wall portion 60 and second wall portion 62. Latching surface 64 forms part of first latch 26. A hook portion 66 is formed at the outer longitudinal edge of second wall portion 62 for forming an inner latching surface 68. Thus, hook portion 66 and latching surface 68 form part of second latch 28.

As seen in FIGS. 2–7, first cover 20 has a substantially U-shaped cross-section along its longitudinal axis, and includes an elongated intermediate portion 70, a first elongated leg 72 extending perpendicularly from intermediate portion 70, and a second elongated leg 74 extending substantially perpendicularly from intermediate portion 70. Preferably, first and second elongated legs 72 and 74 are integrally formed as a one-piece, unitary, integral member with the intermediate portion 70 by extrusion of a somewhat resilient polymeric material, such as vinyl or PVC. Specifically, first elongated leg 72 extends along the entire length of one of the longitudinal edges of intermediate portion 70 and second elongated leg 74 extends along the entire length of the other longitudinally extending edge of intermediate portion 70.

Intermediate portion 70 is preferably roof shaped with two substantially equal planar sections, and includes a longitudinally extending rib 76 formed on its interior surface. Rib 76 is positioned adjacent second leg 74 of first cover 20 so that second leg 34 of base 12 fits between rib 76 and second leg 74 of cover 20 when cover 20 is coupled to base 12 in its closed position as seen in FIG. 4. Accordingly, rib 76 restricts inward movement of second leg 34 of base 12 to prevent inadvertent uncoupling of the cover 20 from base 12.

As seen in FIG. 6, first leg 72 includes at its free end a curved resilient arm 78 extending inwardly therefrom, and an inwardly extending flange 80. Resilient curved arm 78 and flange 80 form part of first pivot joint 24 for pivotally coupling first cover 20 to base 12.

Curved arm 78 forms a first planar stop surface 84 with flange 80. Also, curved arm 78 includes a second planar stop surface 86 at its free end, and an inner curvilinear surface 88 extending through about 180° between the first complementary stop surface 84 and the second complementary planar stop surface 86.

Flange 80 has an outer stop surface 90 on its outwardly facing side and a curvilinear surface 92. Curvilinear surface 92 preferably has an arc of about 51°. Thus, groove 82 and rib 40 have complementary configurations for permitting pivotal movement therebetween.

As seen in FIG. 7, second leg 74 of first cover 20 forms part of first latch 26, and preferably includes a hook portion 100 with an inner latching surface 102 at its free end for engaging outer latching surface 64 of base 12 via a snap-fit. Specifically, second leg 34 of base 12 and second leg 74 of cover 20 are both somewhat resilient so that hook portion 100 of cover 20 can be deflected outwardly as it rides along second wall portion 62 of base 12 during coupling of cover 20 to base 12. In other words, second leg 34 of base 12 and second leg 74 of cover 20 are deflected transversely relative to each other during coupling thereof to provide a snap-fit type latch.

Divider 14 has a first longitudinal edge 104 coupled to the central portion 30 of base 12 by a frangible seam such that divider 14 may be selectively removed to convert duct 10 from a two channel duct into a single channel duct. The second longitudinal edge of divider 14 has second cover 22 integrally formed therewith. Preferably, divider 14 is centered on central portion 30 of base 12 so that channels 16 and 18 are substantially equal in width. Of course, divider 14 can be coupled to central portion 30 so that channels 16 and 18 are unequal in width.

Second cover 22 has a first longitudinal edge 110 coupled to longitudinal edge 106 of divider 14 to form hinge or pivot joint 27 therebetween. Second cover 22 is a flexible and resilient member so that second cover 22 can be releasably coupled to second leg 34 of base 12 via a snap-fit. Preferably, second cover 22 includes a precurved portion 114 extending along longitudinal edge 110, a substantially planar portion 116 extending outwardly from precurved portion 114, and a concaved upwardly hook portion 118 with a latching surface 120 forming a portion of the second latch 28 for engaging hook portion 66 of second leg 34 of base 12.

Precurved portion 114 has a concaved outer surface such that second cover 22 is normally maintained with hook portion 118 spaced from hook portion 66 so that conductors can be inserted therein. When hook portion 118 is coupled to hook portion 66, the precurved portion 114 produces a preloaded force on second cover 22 such that latching surface 120 of second cover 22 is forced against latching surface 68 of base 12. Accordingly, latching surface 120 is forced up against latching surface 68. This arrangement helps to maintain second cover 22 latched to base 12. When second cover 22 is latched to base 12 as seen in FIG. 4, second cover 22 is bent to form a convex outer surface. Thus, the outer concaved surface of precurved portion 114 is bent from its normal concaved position to a convex position.

Installation

In installing multi-channel duct 10, base 12 is mounted to a wall or surface 31 by using screws 33 or the like in the locating recesses 36. In particular, holes can be drilled into locating recess 36 and then screws 33 are inserted into the holes and threaded into wall 31 for securing the base 12 to the wall 31 in a conventional manner. Then, first cover 20 is snap-fitted to base 12 by inserting rib 40 of base 12 into groove 82 of cover 20 as seen in FIG. 1. First cover 12 is then pivoted away from base 12 as shown in FIG. 1 so that a first conductors or set conductors such as a power or communications conductors 122 can be placed into channel 18. Then, second cover 22 is closed so that hook 118 engages hook 66. Now, a second conductor or set of conductors, such as a power or communications wire 124, can be placed into channel 16 in a similar manner at some later time without interfering with the first conductor or conductors. Since the cover 20 and base 12 can be snap-fitted together, they can also be disassembled via removing rib 40 from groove 82 by applying a force, which is perpendicular to the longitudinal axis of duct 10.

While only one embodiment has been chosen to illustrate the invention, it will be understood by those skilled in the art that various changes and modifications can be made herein without departing from the scope of the invention as defined in the appended claims.

What is claimed is:

1. A multi-channel duct for enclosing conductors therein, comprising:

an elongated base having a substantially planar central portion for mounting on a surface, a pair of longitudinal edges and an elongated divider coupled to said central portion of said base, said divider extending substantially perpendicular to said central portion of said base between said longitudinal edges of said base for dividing said base into two longitudinally extending sections;

a first elongated cover for overlying and substantially covering both of said longitudinally extending sections of said base;

first coupling means, coupled to said base and said first cover, for coupling said first cover to said base between a first position covering both of said longitudinally extending sections and a second position exposing at least one of said longitudinally extending sections;

a second elongated cover with first and second longitudinal edges for overlying and substantially covering one of said longitudinally extending sections of said base; and second coupling means, coupled to said base and said second cover, for coupling said second cover to said base between a first position covering one of said longitudinally extending sections and a second position exposing the one of said longitudinally extending sections concealable by said second cover, said second coupling means including a hinge coupled to said second cover and said base for pivotally coupling said second cover relative to said base.

2. A multi-channel duct according to claim 1, wherein said hinge is coupled to said base by said divider.

3. A multi-channel duct according to claim 2, wherein said hinge is integrally formed with said second cover and said divider.

4. A multi-channel duct according to claim 3, wherein said second coupling means further includes a latch coupled to said second longitudinal edges of said second cover and to one of said longitudinal edges of said base for releasably coupling said second cover to said base.

5. A multi-channel duct according to claim 4, wherein
said second cover has a precurved portion for normally maintaining said second longitudinal edge of said second cover spaced away from said one of said longitudinal edges of said base when said second cover is in said second position.

6. A multi-channel duct according to claim 5, wherein
said precurved portion is adjacent said hinge.

7. A multi-channel duct according to claim 6, wherein
said divider is coupled to said base by a frangible seam for removing said divider and said second cover from said base.

8. A multi-channel duct according to claim 7, wherein
said first coupling means includes a pivot joint coupled to said base and said first cover for pivotally coupling a first longitudinal edge of said first cover to said base, and a latch coupled to said base and said first cover for releasably coupling a second longitudinal edge of said cover to said base.

9. A multi-channel duct according to claim 1, wherein
said second cover has a precurved, resilient portion which is preloaded for biasing said second cover away from said base when said second cover is maintained in said first position by said second coupling means.

10. A multi-channel duct according to claim 2, wherein
said hinge of said second coupling means is a resilient hinge integrally coupled to said divider and said second cover.

11. A multi-channel duct according to claim 10, wherein
said divider is coupled to said base by a frangible seam for removing said divider and said second cover from said base.

12. A multi-channel duct according to claim 11, wherein
said hinge extends substantially along the entire length of said divider.

13. A multi-channel duct for enclosing conductors therein, comprising:

an elongated base having a substantially planar central portion with first and second longitudinal edges;

an elongated divider having a first longitudinal edge coupled to said central portion of said base, and a second longitudinal edge spaced from said central portion of said base with a partition extending substantially perpendicular to said central portion of said base between said first and second longitudinal edges of said base for dividing said base into two longitudinally extending sections;

a first elongated cover for overlying both of said longitudinally extending sections, and having an intermediate portion with first and second longitudinal edges;

a first pivot joint coupled to said base and said first cover for coupling said first longitudinal edge of said base to said first longitudinal edge of said first cover;

a first latch coupled to said base and said first cover for releasably coupling said second longitudinal edge of said base to said second longitudinal edge of said first cover;

a second elongated cover for overlying one of said longitudinally extending sections, and having first and second longitudinal edges;

a second pivot joint coupled to said first longitudinal edge of said second cover and said second longitudinal edge of said divider for pivotally coupling said second cover to said divider; and a second latch coupled to said base and said second cover for releasably coupling said second longitudinal edge of said second cover to one of said longitudinal edges of said base between a first position covering one of said longitudinally extending sections and a second position exposing the one of said longitudinally extending sections concealable by said second cover.

14. A multi-channel duct according to claim 13, wherein
said second cover includes a precurved, resilient portion which is preloaded for biasing said second cover away from said base when said second cover is maintained in said first position by said second coupling means.

15. A multi-channel duct according to claim 14, wherein
said second pivot joint is integrally formed with said second cover and said divider.

16. A multi-channel duct according to claim 15, wherein
said base includes a first leg which forms part of said first pivot joint, and a second leg which forms part of said first latch.

17. A multi-channel duct according to claim 16, wherein
said first cover is substantially U-shaped with a first leg extending substantially perpendicular from said first longitudinal edge of said first cover to form part of said first pivot joint, and a second leg extending substantially perpendicular from said second longitudinal edge of said first cover to form part of said first latch.

18. A multi-channel duct according to claim 17, wherein
said second latch includes a first latching surface formed on said second leg of said base, and a second latching surface on said second longitudinal edge of said second cover.

19. A multi-channel duct according to claim 18, wherein
said first latch includes a first latching surface formed on said second leg of said base, and a second latching surface formed on said second leg of said first cover.

20. A multi-channel duct according to claim 19, wherein
said second leg of said base has an exterior surface with said first latching surface of said first latch formed thereon.

21. A multi-channel duct according to claim 20, wherein
said second leg of said base has an interior surface with said first latching surface of said second latch formed thereon.

22. A multi-channel duct according to claim 21, wherein
said divider is coupled to said base by a frangible seam for removing said divider and said second cover from said base.

* * * * *